H. W. DYER.
CALCULATING DEVICE.
APPLICATION FILED OCT. 21, 1912.
1,191,678.
Patented July 18, 1916.
2 SHEETS—SHEET 1.
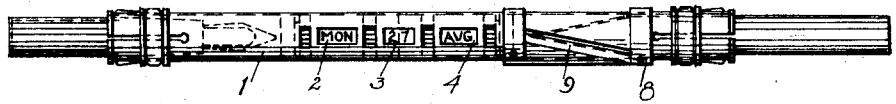
·FIG·1·
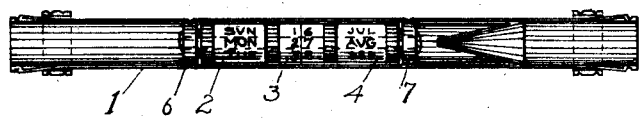
·FIG·2·
 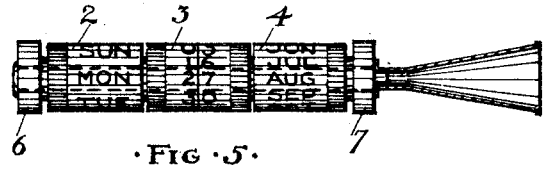
·FIG·3· ·FIG·5·
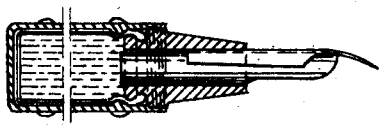 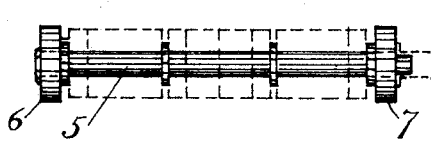
·FIG·4· ·FIG·6·
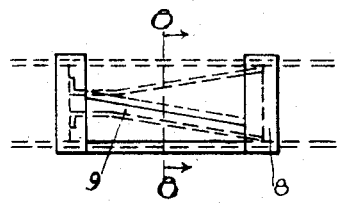 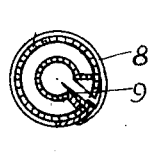 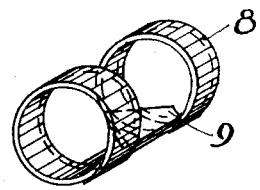
·FIG·7· ·FIG·8· ·FIG·9·
·FIG·10·
WITNESSES
Chas. H. Harris
A. Rozinsky
INVENTOR
Harry W. Dyer
BY
Lewis J. Doolittle
ATTORNEY H. W. DYER.
CALCULATING DEVICE.
APPLICATION FILED OCT. 21, 1912.
1,191,678.
Patented July 18, 1916.
2 SHEETS—SHEET 2.
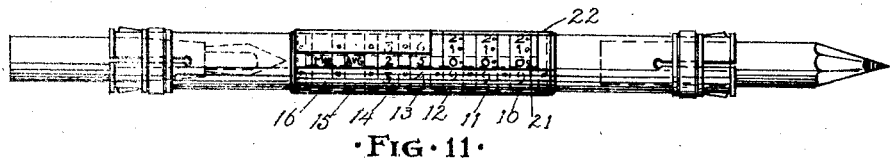
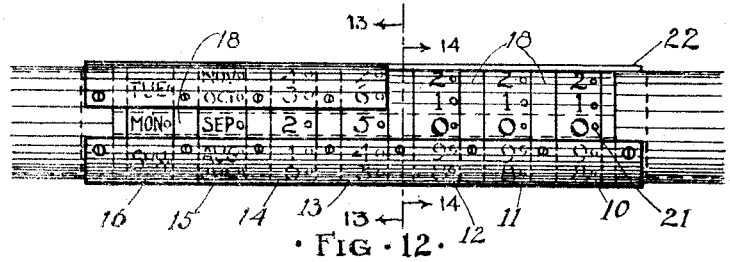
FIG. 13.
FIG. 14.
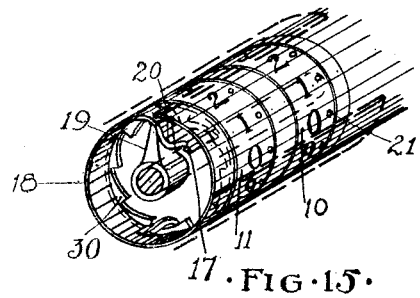
FIG. 15.
FIG. 17.
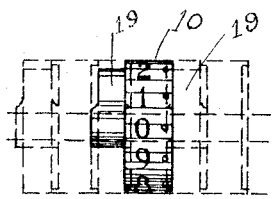
FIG. 16.
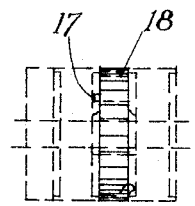
FIG. 18.
WITNESSES
INVENTOR
Harry W. Dyer
BY
Lewis J. Doolittle
ATTORNEY

UNITED STATES PATENT OFFICE.

HARRY W. DYER, OF EAST ORANGE, NEW JERSEY.

CALCULATING DEVICE.

1,191,678.  Specification of Letters Patent.  Patented July 18, 1916.

Application filed October 21, 1912. Serial No. 726,966.

*To all whom it may concern:*

Be it known that I, HARRY W. DYER, a citizen of the United States, and resident of East Orange, Essex county, New Jersey, have invented certain new and useful Improvements in Calculating Devices, of which the following is a specification.

This invention relates to a new and useful article of manufacture and has for its object the provision of a device which may be inexpensive to manufacture, simple in construction and which may be adapted to many useful purposes.

In carrying out the invention, I provide a holder which may be conveniently used for a pen and pencil, which holder is provided with a calculating device which may be constructed so as to be used as a perpetual calendar or as an adding device, or for both purposes, as well as many other useful objects, some of which will appear hereinafter in connection with the description of the various embodiments of the invention shown in the accompanying drawings for the purposes of illustration.

In the drawings like parts in the several views have been given the same reference numeral.

Figure 1 is a side elevation of one form of the invention. Fig. 2, Fig. 3, Fig. 4, Fig. 5, Fig. 6 and Fig. 7 are detail views. Fig. 8 is a sectional view on the line 8—8 of Fig. 7. Fig. 9 is an isometric view of Fig. 7. Fig. 10 is an elevation of a modification of the invention. Fig. 11 is an elevation of another modification of the invention. Fig. 12 is an enlarged elevation of a portion of Fig. 11. Fig. 13 is a sectional view on the line 13—13 of Fig. 12, looking in the direction of the arrows. Fig. 14 is a sectional view on the line 14—14 of Fig. 12, looking in the direction of the arrows. Fig. 15 is an isometric view of Fig. 12. Fig. 16 is a detail view. Fig. 17 is a view similar to Fig. 13, showing the parts in another position. Fig. 18 is a detail view. Figs. 19 and 20 are isometric views, similar to Fig. 15, showing the successive positions of the operating members.

In Figs. 1 to 10 the holder 1 is provided with a series of indicating wheels, such as 2, 3 and 4, which may be provided with designations for the days of the week, days of the month and the months, respectively, to form a perpetual calendar. These indicators may each be in the form of a sleeve rotatively mounted upon the shaft 5 which is held at either end in the collars 6 and 7 mounted in the holder 1.

The holder 1 may be provided at one end with a removable pen, shown at the left of Fig. 1 and also in Fig. 3. The opposite end of the holder 1 may be provided with a pencil holder and also with a pencil sharpener, as shown at the right of Fig. 1 and also in Figs. 7, 8 and 9. The pencil sharpener may be composed of a supporting shell 8 in which a knife 9 may be removably mounted, as shown in Figs. 7, 8 and 9.

The pencil sharpener may be omitted and the device constructed as a pen and pencil holder with the calendar, as shown in Fig. 10.

A fountain pen with a reservoir may be used in one end of the holder and constructed as shown in Fig. 4.

In Figs. 11 and 12 the device is shown as provided with a combined calendar and adding device. Three indicating or adding counters are shown at the right of Fig. 12 at 10, 11 and 12 and the calendar indicators are shown at the left at 13, 14, 15 and 16. These counters are provided with interior ratchet teeth 30 which are engaged by lateral projections 17 from one side of each of a series of circular springs 18 located one between each of the counters. Each of these indicators also carries an operating finger 19 formed on the radial wall thereof which engages the spring 18 and as the same are rotated, the operating finger engages the offset portion 20 of the spring 18, causing the same to straighten out and move the projection 17 into engagement with one of the ratchet teeth of the adjacent counter or indicator and advance the same one number, by reason of the lengthening of the offset portion 20 as it is straightened out, the finger passing from under the straightened portion 20 as the rotation of the counters is continued.

Ten ratchet teeth are provided on each of the indicating counters 10, 11 and 12, so that one revolution of the "unit" counter will advance the adjacent or "tens" counter one tooth, etc. It will be understood that any desired number of these counters may be provided for adding a column of figures. One advantage of this arrangement and construction is that the numbers may be added by setting the counters either from left to right or from right to left, and, furthermore, it is not necessary to set the counters for successive numbers in the same direction in order to secure the correct result.

For setting the counters a series of holes are provided, such as 21 in the counter 10, in which any sharp pointed instrument, such as a pencil, may be inserted for turning the same. The springs 18 are each fastened at one end to a shell 22 which partially incloses the springs and counters but is cut away, as shown in Fig. 12, to permit the counters to be turned in the manner described. The projections 17 being formed on the free ends of the springs. The offset portions 20 project under the fastened end of the spring which provides an abutment to insure of the straightening of such offset portion when the operating finger passes thereunder. The counters are retained against backward rotation by pawls 23 struck out from the springs 18 and engaging the ratchet teeth on the counters.

The calendar portion of the device at the left of Fig. 12 may be operated in a similar manner by providing a series of ratchet teeth on each counter or indicator corresponding to the designations appearing thereon.

The calendar arrangement shown in Figs. 1, 2 and 5 may be provided with similar means for advancing the indicators or the same may be mounted so as to be rotated independently, this latter arrangement being preferred where it is desired to reduce the cost of manufacture to the lowest possible amount.

It will thus be seen that the device is compact and simple in construction and possesses many useful functions. It will be understood that the details of construction may be varied to meet the requirements of the manufacturer or the purposes for which the device is to be used and it is intended that the foregoing description of the invention shown in the accompanying drawings shall be taken as illustrative merely of some of the many possible embodiments of the invention and not in a limiting sense.

What I claim is:

1. An article of manufacture comprising a pair of indicators rotatively mounted on a common axis, a circular spring located between said indicators, said spring having a laterally projecting portion adapted to engage and operate one of said indicators, said spring also having a portion bowed inwardly, and an operating member carried by the other indicator and adapted to engage and straighten said bowed portion of the spring to cause the laterally projecting portion of said spring to operate the first mentioned indicator.

2. An article of manufacture comprising, a cylindrical holder, a pair of indicators rotatively mounted in said holder co-axially therewith, a circular spring positioned in said holder, said spring being secured at one end to said holder and having the opposite end free to move, said spring having on its free end a laterally projecting portion adapted to engage and operate one of said indicators, said spring also having a portion bowed inwardly, and an operating member carried by the other indicator and adapted to engage and straighten said bowed portion of the spring to cause the laterally projecting portion of said spring to operate the first mentioned indicator.

Signed at New York city, in the county of and State of New York, this 16th day of October, 1912.

HARRY W. DYER.

Witnesses:
 EDWARD C. HAVILAND,
 JOHN F. SUNDERLAND.

Copies of this patent may be obtained for five cents each, by addressing the "Commissioner of Patents, Washington, D. C."